May 20, 1958     B. C. LATZKE     2,835,400
TRAILER FOR TRANSPORTING BOATS, ETC
Filed Sept. 8, 1955     3 Sheets-Sheet 1
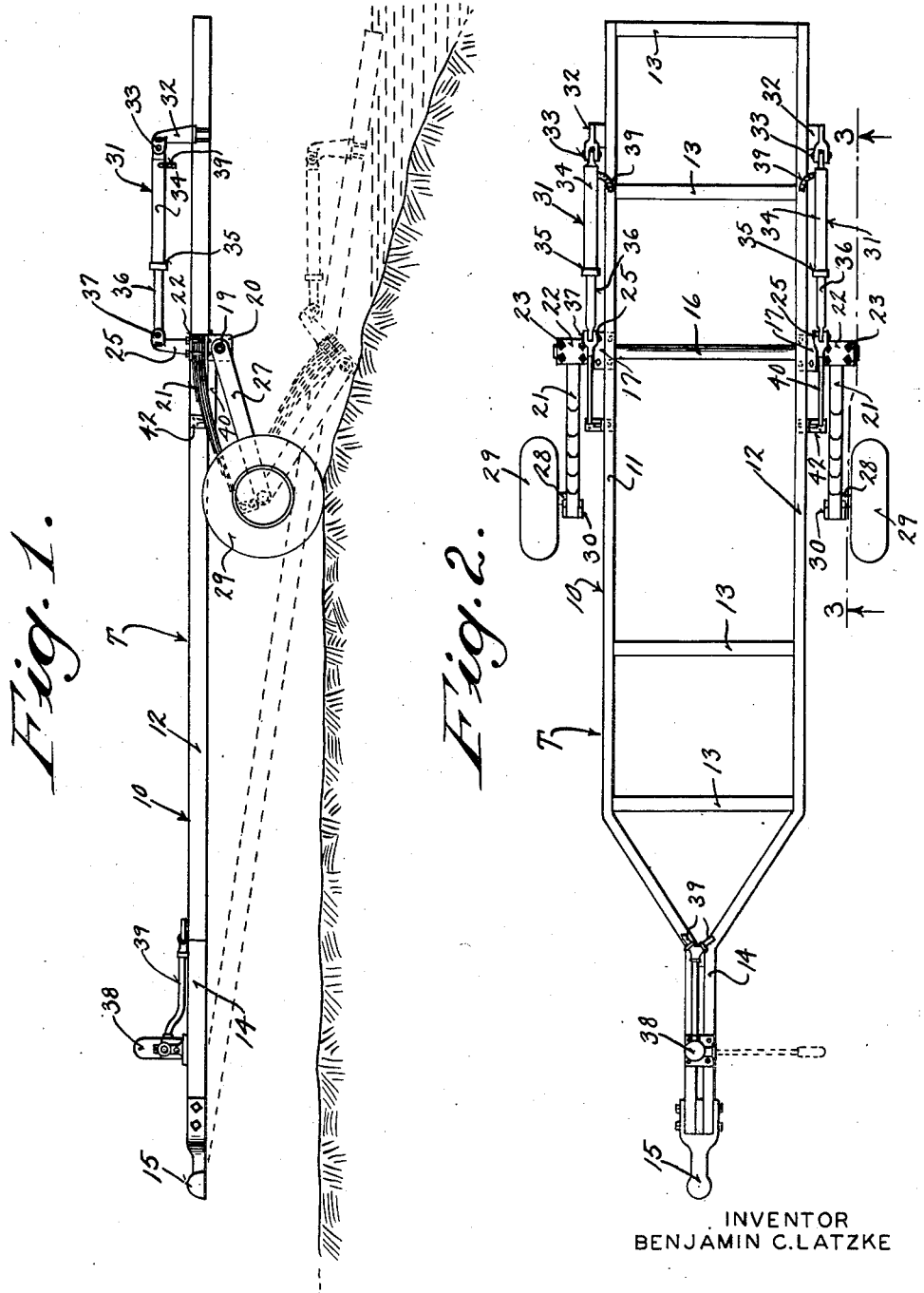
INVENTOR
BENJAMIN C. LATZKE
BY
*Young and Wright*
ATTORNEYS May 20, 1958          B. C. LATZKE          2,835,400
TRAILER FOR TRANSPORTING BOATS, ETC
Filed Sept. 8, 1955          3 Sheets-Sheet 2
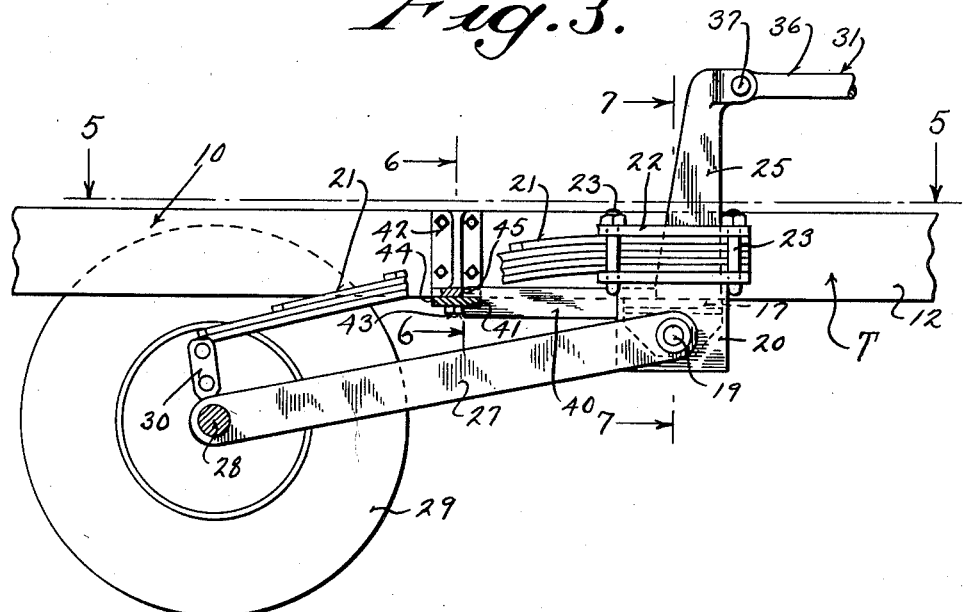
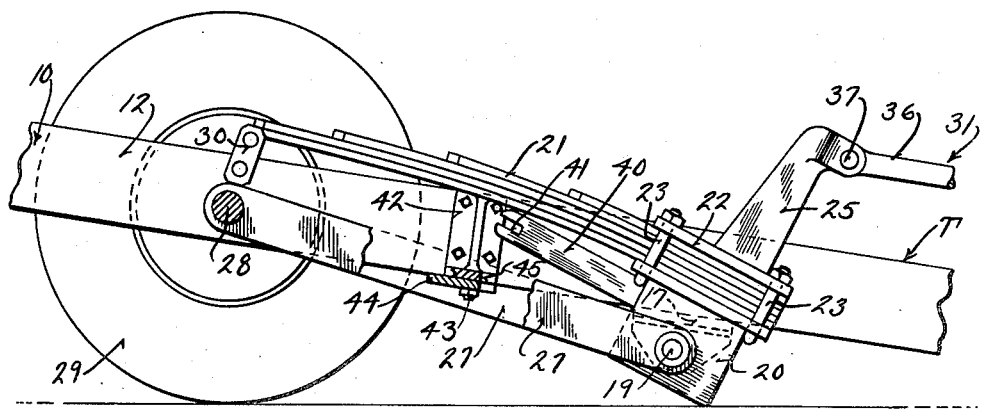
INVENTOR
BENJAMIN C. LATZKE
BY
*Young and Wright*
ATTORNEYS May 20, 1958        B. C. LATZKE        2,835,400
TRAILER FOR TRANSPORTING BOATS, ETC
Filed Sept. 8, 1955        3 Sheets-Sheet 3
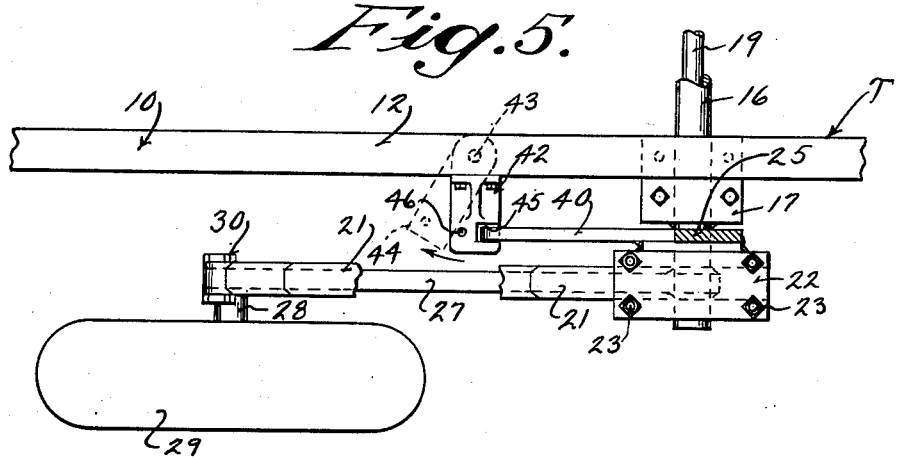
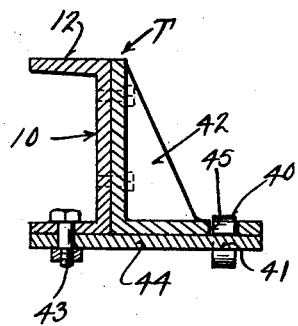
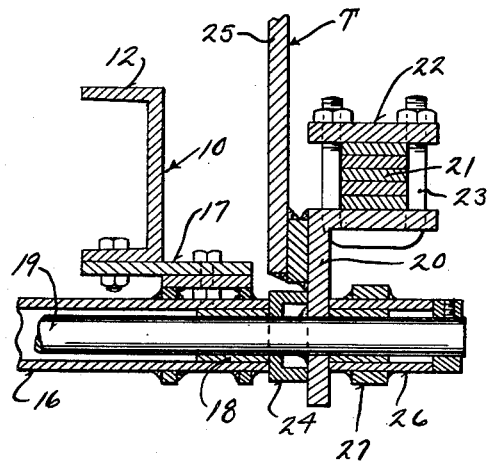
INVENTOR
BENJAMIN C. LATZKE
BY
*Manning and Wright*
ATTORNEYS United States Patent Office 2,835,400
Patented May 20, 1958

2,835,400

TRAILER FOR TRANSPORTING BOATS, ETC.

Benjamin C. Latzke, Oconomowoc, Wis.

Application September 8, 1955, Serial No. 533,073

1 Claim. (Cl. 214—506)

This invention appertains to trailers for use in conjunction with a pulling vehicle, such as an automobile and more particularly to a trailer adapted for the transportation of boats.

Much difficulty is experienced in the loading and unloading of boats from trailers, particularly where the boat is of a heavy character such as employed with inboard or outboard motors, and damage often results in the handling of the boat.

One of the primary objects of my invention is to provide a two-wheeled trailer with a novel and simple means for tilting the frame of the trailer on its hitch and at an angle to the horizontal, so that a boat can be easily slid off and on the trailer without the necessity of bodily lifting and carrying the boat.

Another salient object of my invention is the provision of a novel spring suspension for the wheels of the trailer, with means for raising and lowering the wheels and the spring suspension, so that as the wheels are raised the frame of the trailer will lower and swing down on its hitch and whereby when the wheels are lowered the frame will be raised to a normal travelling position.

A further object of my invention is the provision of means whereby the trailer can be backed to the bank of a lake or river so that upon the tilting of the frame, a boat can be easily slid off and on the trailer into or out of the water.

A further important object of my invention is the provision of a trailer embodying a transversely extending tortion tube rigidly carried intermediate the ends of the frame having mounted therein for turning movement a shaft, to which is rigidly secured the saddles for the wheel springs, the wheels being rotatably carried by forwardly extending arms rockably mounted on the shaft, means being provided for rocking the shaft, so as to turn the saddles and springs and thus raise or lower the wheels relative to the frame according to the direction of the turning movement of the shaft.

Another further important object of my invention is the provision of hydraulic rams operatively connected to the shaft for turning the shaft, and a pump under control of the operator for forcing fluid to the rams.

A still further object of my invention is the provision of releasable means for firmly locking the saddles and shaft against turning movement when the wheels are in their normal position for road travel, whereby accidental turning movement of the shaft will be prevented.

A still further object of my invention is to provide a boat trailer of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawings, in which drawings, Figure 1 is a side elevational view of my improved trailer showing the frame in its normal horizontal position for road travel, with the trailer backed up to the bank of a river or lake, the view also showing in dotted lines, the position of the frame upon the raising of the wheels to permit the sliding of a boat off or on the trailer;

Figure 2 is a top plan view of the trailer;

Figure 3 is an enlarged fragmentary longitudinal sectional view through the trailer, taken on the line 3—3 of Figure 2, looking in the direction of the arrows, the view showing the spring saddles in their locked position against accidental turning movement;

Figure 4 is a view similar to Figure 3, but showing the spring saddles released for turning movement and the wheels raised for bringing about the tilting of the frame;

Figure 5 is a fragmentary horizontal sectional view taken on the line 5—5 of Figure 3, looking in the direction of the arrows;

Figure 6 is a detail transverse sectional view taken on the line 6—6 of Figure 3, looking in the direction of the arrows and illustrating the releasable latch employed for holding the spring saddles against accidental turning movement, and Figure 7 is a detail transverse sectional view taken on the line 7—7 of Figure 3, looking in the direction of the arrows, illustrating the mounting of the shaft in the tortion tube and the mounting of the spring saddles and wheel carrying arms thereon.

Referring to the drawings in detail, wherein similar reference characters designate corresponding parts throughout the several views, the letter T generally indicates my novel trailer.

This trailer T includes a fabricated rigid frame 10 and the frame can be built up in any preferred manner. As illustrated, the same includes a pair of spaced parallel longitudinally extending channel beams 11 and 12, and these beams are braced at spaced points by transversely extending beams 13. The beams 11 and 12 at their extreme forward ends converge toward one another, as at 14, and carry the ball or head part 15 of a hitch. As is common practice, the socket part of the hitch is carried by the pulling vehicle and is not shown in the present drawings.

In accordance with my invention, I rigidly secure to the beams 11 and 12 a transversely extending tortion tube 16, and by referring particularly to Figures 1 and 2, it can be seen that this tube is located a considerable distance inward of the rear end of the frame of the trailer. While the tube 16 can be secured in various manners to the beams 11 and 12, I preferably secure outwardly extending plates 17 to the lower flanges of of the beams and the tube to the outer ends of these plates. This is best shown in Figure 7. Mounted in suitable bearings 18 within the tube 16 is a transversely extending shaft 19 and the terminals of this shaft extend beyond the ends of the tube 16 and the frame of the trailer. Welded, or otherwise secured to the shaft 19 adjacent to its terminals are saddle brackets 20 for the reception of the forward ends of semi-eliptical springs 21. The springs 21 are firmly secured to the saddle brackets 20 by the use of clamp plates 22 and U-bolts 23. Spacers 24 are preferably placed on the shaft 19 between the ends of the tube 16 and the saddle brackets 20. Welded or otherwise rigidly fastened to the saddle brackets 20 are upstanding crank levers 25, the purpose of which will later appear.

Mounted upon the extreme terminals of the shaft 19 are bearing sleeves 26 and these sleeves have rigidly affixed thereto for rocking movement therewith, forwardly extending arms 27. These arms in turn have their forward ends provided with outwardly extending spindles or stub axles 28 for rotatably supporting the ground wheels 29. The forward ends of the arms 27 carry shackles 30 for securing the forward ends of the springs 21 to the arms 27.

From the description so far, it can be seen that upon movement of the crank levers 25, the shaft 19 can be turned, thus swinging the saddle brackets 20 and the springs 21 therewith and upon release of the springs the weight of the frame will move the same downwardly, allowing the wheels 29 to rise. When the head or ball 15 is connected to the socket, the frame will swing on such socket to a lowered, inclined position and thus permit the easy sliding of a boat on and off a trailer. It is to be undertood, of course, that the frame carries any desired type of means for receiving and holding a boat.

When the crank levers 25 are turned in a counterclockwise direction (see Figure 4), the outer ends of the springs 21 will be forcibly moved down, raising the frame and lowering the wheels and the movement of the crank levers 25 in a counter-clockwise direction is continued until the frame reaches a desired elevated, horizontal position.

Means 31 is provided for actuating and controlling the movement of the crank levers 25 and this mechanism will be later described in detail.

Any preferred type of means can be employed for operating the lever cranks 25 but I prefer to use hydraulic jacks or rams for this purpose. As illustrated, brackets 32 are rigidly secured to the frame 10 rearwardly of the shaft 19 and these brackets pivotally support, as at 33, the cylinders 34 of hydraulic rams 35. Pistons 36 are reciprocally mounted within the cylinders and the forward ends of the pistons are in turn pivotally connected, as at 37, to the crank levers 25. Mounted on the frame 10 at a convenient point, is a hand operated pump 38 for forcing liquid under pressure to the rams and lines 39 lead from the pump to the rear ends of the cylinders 34. The pump is of the type for delivering fluid under pressure to the cylinders, with a valve for permitting exhaust of the liquid from the rear end of the cylinders back to the pump or its reservoir.

Upon release of fluid from the cylinders, the weight of the frame will rock the crank levers 25 rearwardly and push the pistons 36 within their cylinders, which will permit the lowering of the frame and the raising of the wheels. When fluid under pressure is forced into the cylinders, the pistons 36 will be forced outwardly and these pistons will function to push the crank levers in a counterclockwise direction, see Figure 4, and thus move the crank levers to their normal vertical position with the frame in its raised position and the wheels in their lowered position.

With the frame in its raised position, and the wheels in their lowered position for road travel, means is provided for releasably locking or holding the shaft 19 and the spring saddle brackets against turning movement. This means includes forwardly extending latch arms 40 which are rigidly carried by the crank levers 25. The forward ends of these latch arms 40 are provided with keeper slots 41. Bolted or otherwise affixed to the main channel beams 11 and 12 are outwardly projecting brackets 42 and these brackets have mounted below the same on pivots 43, swinging latch plates 44. The brackets 42 can have slots 45 therein for receiving the forward ends of the latch arms 40 when the latch arms are in their normal position, so as to prevent lateral shifting of said arms. The latch plates 44 can be swung into the keeper slots 41 and when the latch plates are in this position, the latch arms 40 are rigidly locked in place against movement. This in turn, will hold the crank levers 25, the shaft 19 and the saddle brackets 20 against accidental movement. If desired, the supporting brackets 42 and the latch plates 44 can be provided with openings 46, which are adapted to align when the latch plates are in their locked position. These registering openings 46 can receive a removable lock pin (not shown).

From the foregoing description, it can be seen that I have provided an efficient, but simple trailer, in which the frame thereof can be tilted at an angle to the horizontal for facilitating the sliding of a boat thereon or the sliding of a boat therefrom.

Various changes in details may be made without departing from the spirit or the scope of this invention, but what I claim as new is:

A trailer comprising a frame, a transversely extending torsion tube rigidly secured to the frame intermediate the ends thereof, a shaft rockably mounted in said tube and projecting beyond the opposite ends of the tube and the sides of the frame, outwardly extending wheel supporting arms rockably mounted at their inner ends on the shaft, ground wheels rotatably carried by the outer ends of the arms, upwardly extending saddle brackets rigidly secured to the shaft for rocking movement therewith, semi-elliptical springs anchored at their inner ends to the saddle brackets above said arms, and said springs extending outwardly in the same direction as the arms and lying above the arms, shackles pivotally connecting the outer ends of the springs to the outer ends of said arms, upwardly extending crank levers rigidly secured to the shaft and saddle brackets, means for operating said crank levers to rock said shaft and saddle brackets including hydraulic rams operatively connected to the frame and the crank levers, outwardly extending latch arms rigidly carried by the shaft at their inner ends and positioned between the arms and springs, said latch arms having keeper slots at their outer ends, and swinging latch plates carried by the frame movable into said keeper slots when said latch arms are in one position.

References Cited in the file of this patent

UNITED STATES PATENTS

| | | |
|---|---|---|
| 2,453,388 | Schramm | Nov. 9, 1948 |
| 2,495,449 | Francis | Jan. 24, 1950 |
| 2,610,865 | Cantrell | Sept. 16, 1952 |
| 2,681,811 | Green | June 22, 1954 |
| 2,706,009 | Schramm | Apr. 12, 1955 |
| 2,719,726 | Johnston | Oct. 4, 1955 |